Patented Dec. 16, 1930

1,785,367

UNITED STATES PATENT OFFICE

CARL H. SIEVER, OF OAK PARK, ILLINOIS

COATING COMPOSITION AND METHOD OF PREPARING THE SAME

No Drawing. Application filed February 2, 1927. Serial No. 165,503.

My invention relates to a composition of matter. It relates, more particularly, to a coating composition containing a cellulose derivative, preferably cellulose nitrate, and a treated rubber, such as an artificial isomer of rubber prepared by treating the unvulcanized rubber with a sulfonic acid compound. The invention also includes as a constituent part thereof the process for producing such coating compositions.

The object is to provide a coating composition which will combine the hard, tough, and waterproof qualities of cellulose nitrate with the elasticity, flexibility, and strength of raw, unvulcanized rubber in a single coating composition.

Another object is to provide a coating composition of this character which will be readily usable by the usual methods of flowing, dipping, brushing and spraying, which will adhere readily to a smooth surface without the necessity of a special undercoating material, which will yield a quick drying, waterproof and resistant coating, and which, in addition to its toughness and flexibility, will provide a coating composition having improved insulating and dielectric characteristics.

Another object is to provide a flexible coating composition containing resinous bodies.

Another object is to provide a cellulose composition containing a high percent of rubber.

Other objects will appear as the detailed description of the invention proceeds.

Heretofore rubber has not been successfully combined with cellulose nitrate because the ordinary commercial solvents for one are non-solvents for the other. When a solution of raw, unvulcanized rubber is mixed with a solution of cellulose nitrate, the resulting mixture usually separates into two immiscible layers, the upper layers generally containing the rubber and the lower layer containing the cellulose nitrate. Also, the extremely high, superficial viscosities and the pronounced stringing tendencies peculiar to solutions of raw, unvulcanized rubber have made it impossible to prepare solutions containing a mixture of these substances in concentrations sufficient to be of practical importance in the manufacture of coating compositions.

I have found that when raw, unvulcanized rubber is heated at the usual vulcanizing temperatures for a considerable length of time in the presence of certain acid bodies, the rubber acquires new and important viscosity characteristics. These acid bodies may consist of sulfuric acid or reagents having the general formula $R-SO_2-X$, wherein R represents an organic radical or a hydroxy group and X represents a hydroxy group or chlorine, such reagents including sulfonic acids, organic sulfonyl chlorides, etc. This modified rubber, when dissolved in ordinary rubber solvents, yields solutions of unusually low relative viscosities as compared with the relative viscosities of corresponding solutions of the original rubber. This treated rubber has the same empirical formula as the ordinary rubber and may be referred to as an isomer rubber. Furthermore, I have discovered that many of these solutions can be mixed with suitable solutions of cellulose nitrate to give immiscible low viscosity solutions containing both the cellulose derivative and the modified rubber in relatively high concentrations.

A preferred embodiment will best illustrate the invention: One hundred (100) parts, by weight, of high quality plantation rubber is masticated on a rubber mill with from five (5) to ten (10) parts, by weight, of para toluene sulfonic acid. When thorough mixing has been obtained by the milling, the mixture is heated in an oven at approximately 120 degrees centigrade for forty-eight (48) hours. The resulting product is then re-worked on a rubber mill in contact with a stream of water for removing any water-soluble sulfonic acid or other impurities. After drying in an oven the product may be dissolved in a suitable organic solvent in the following proportions:

> 24 ounces treated rubber
> 1 gallon benzene
> 1 gallon toluene

A low viscosity cellulose nitrate solution is now prepared by treating cotton with nitric acid in the presence of acids or bases under pressure and for a considerable length of time, as is well known in the art. This grade of cellulose nitrate is known in the art as "soluble cotton" or "half second cotton". A solution of this cotton is prepared by mixing:

> 96 ounces soluble cotton
> 1 gallon ethyl acetate
> 1 gallon normal butyl acetate
> 1 gallon toluene The coating composition is now prepared by slowly adding one (1) volume of the rubber solution to an equal volume of the cellulose nitrate solution with constant stirring. This step is important and unless it is carefully carried out some of the cellulose nitrate will be precipitated, yielding a substance which is not easily redissolved.

The toluene used in both solvents serves the double function of preventing chemical reaction between the acetates and the metal container, and in preventing the separation of the rubber as it comes in contact with the acetate solution.

For a very flexible coating, I may add to this composition a plasticizing agent, for example, two (2) parts, by volume, of tricresyl phosphate to one hundred (100) parts of the mixed solution.

With a view to increasing the hardness, luster and body of the applied coatings, I may add to the above described liquid coating compositions certain resins, or resinous materials including japans, varnishes, oleaginous-resinous materials, and the like. Of the resins, I may use natural occurring resins including kauri, pontianak, East India gum, dammar, mastic, shellac, etc., or I may employ synthetic resinous bodies including glycerides of rosin, phenol-formaldehyde condensation products, etc. However, the incorporation of resins in lacquer compositions causes decided tendencies towards brittleness, and friability of the film.

With a view to further increasing the flexibility of the dry coatings, I may add to the liquid coating compositions, described above, certain plasticizing agents, such as triphenyl phosphate, diamyl phthalate, etc., or I may add certain vegetable oils or derivatives thereof including such oils as castor, rape, cottonseed, perilla, linseed, and China wood.

For protective, decorative, or other purposes, I may add pigments, colors, dyestuffs, inerts, and kindred bodies to the coating compositions described above. By way of illustration, in order to prepare a black pigmented coating, I may add two (2) ounces of carbon black and six (6) ounces of diamyl phthalate to each gallon of coating composition and agitate or grind the mixture in a pebble mill, or other suitable means, until the pigment aggregates are broken up and the pigment particles are thoroughly dispersed in the liquid medium.

I may add to the above described coating compositions certain age-resistors, anti-oxidants, or stabilizing agents for the purpose of protecting said artificial isomer of rubber against possible deterioration. For example, I may add a condensation product of acetaldol with alpha naphthylamine, or any other bodies which may be used for preventing or retarding the deterioration of rubber products.

It is understood that the preferred embodiment is given by way of example only and that I am not limited to the materials or procedure set forth except as defined by the appended claims.

Various proportions of the two solutions may be mixed, and various amounts of pigments or resins may be included, as will be apparent to those skilled in the art. Cellulose acetate and cellulose ethers may be used in place of cellulose nitrate. I have noticed that percentages of rubber in the applied film as low as ten percent have a noticeable beneficial action but of course the result may be greatly improved by incorporating greater proportions of rubber.

The term "cellulose derivatives" and "cellulose nitrates", as used in the specification and claims, refers to those compounds which yield solutions of low viscosity with the organic solvents so that the usual processes of dipping, spraying, brushing, or flowing may be used in applying the solution.

The term "treated rubber", as used in the claims, refers to artificial isomers of rubber or other products resulting from the treatment of raw, unvulcanized rubber which yield a solution having low viscosity characteristics.

Having thus described my invention, what I claim as new and desire to secure by Letters Patent is:

1. A coating composition including a cellulose derivative, an organic solvent, and an artificial isomer of rubber obtained by heating rubber with an acid reagent having the formula $R-SO_2-X$, where R is an organic radicle or a hydroxyl group, and X represents a halogen or a hydroxyl group.

2. A coating composition including a cellulose derivative, an organic solvent including toluene, and an artificial isomer of rubber obtained by heating rubber with an acid reagent having the formula $R-SO_2-X$, where R is an organic radicle or a hydroxyl group, and X represents a halogen or a hydroxyl group.

3. A coating composition including cellulose nitrate, an organic solvent, and an artificial isomer of rubber obtained by heating rubber with an acid reagent having the formula $R-SO_2-X$, where R is an organic radicle or a hydroxyl group, and X represents a halogen or a hydroxyl group.

In witness whereof, I hereunto subscribe my name this 31st day of January, 1927.

CARL H. SIEVER.